(12) United States Patent
Hohmann et al.

(10) Patent No.: US 8,240,622 B2
(45) Date of Patent: Aug. 14, 2012

(54) INTEGRAL CLIP OF PLASTIC MATERIAL

(75) Inventors: Gerd Hohmann, Sommerhausen (DE);
 Daniel Schneider, Tauberrettersheim
 (DE); Markus Ferdinand, Donsieders
 (DE)

(73) Assignee: **ITW Automotive Products GmbH &
 Co. KG**, Iserlohn (DE)

( * ) Notice: Subject to any disclaimer, the term of this
 patent is extended or adjusted under 35
 U.S.C. 154(b) by 232 days.

(21) Appl. No.: 12/672,423

(22) PCT Filed: Jul. 2, 2008

(86) PCT No.: PCT/IB2008/001746
 § 371 (c)(1),
 (2), (4) Date: Feb. 5, 2010

(87) PCT Pub. No.: WO2009/019548
 PCT Pub. Date: Feb. 12, 2009

(65) Prior Publication Data
 US 2011/0290969 A1 Dec. 1, 2011

(30) Foreign Application Priority Data
 Aug. 9, 2007 (DE) ............... 20 2007 011 105 U

(51) Int. Cl.
 *F16B 19/00* (2006.01)
(52) U.S. Cl. ............ 248/216.1; 248/231.81; 411/508;
 24/297; D8/382
(58) Field of Classification Search ........... 248/231.81,
 248/216.1, 71, 48.2, 69; 411/508, 501, 510;
 24/297, 581.1; 174/164; D8/382
 See application file for complete search history.

(56) References Cited

U.S. PATENT DOCUMENTS

| | | | | |
|---|---|---|---|---|
| D326,605 S | * | 6/1992 | Nakanura | D8/382 |
| 5,165,833 A | * | 11/1992 | Watanabe et al. | 411/508 |
| D380,667 S | * | 7/1997 | Kanamori et al. | D8/382 |
| D382,466 S | * | 8/1997 | Hirose | D8/382 |
| 5,797,714 A | | 8/1998 | Oddenino | |
| 7,045,715 B2 | * | 5/2006 | Ono | 174/72 A |
| 7,059,659 B2 | | 6/2006 | Smith et al. | |
| 7,152,281 B2 | * | 12/2006 | Scroggie | 24/297 |
| 7,770,266 B2 | * | 8/2010 | Higgins et al. | 24/297 |
| 7,878,749 B2 | * | 2/2011 | Edland | 411/508 |
| 7,988,105 B2 | * | 8/2011 | Kamiya et al. | 248/71 |
| 2005/0150087 A1 | | 7/2005 | Lydan | |
| 2006/0086765 A1 | | 4/2006 | Harberts et al. | |
| 2006/0231690 A1 | * | 10/2006 | Cooley et al. | 248/71 |

OTHER PUBLICATIONS
ISR for PCT/IB2008/001746 dated Jan. 21, 2009.

* cited by examiner

*Primary Examiner* — Anita M King
(74) *Attorney, Agent, or Firm* — Lowe Hauptman Ham &
Berner LLP

(57) ABSTRACT

The disclosure concerns a clip having a first shank including a distal end and a proximal end, a head attached to the distal end, a resilient flange attached to the first shank proximate to the proximal end, a second shank extending downwardly from the resilient flange, wherein the second shank includes a free end. A pair of spring members extending obliquely from the free end to the resilient flange, each of the pair of spring members being attached to the resilient flange by a snap-in shoulder, and a pair of longitudinal members extending from the free end and each having a securing element at an opposing end proximate to the resilient flange, wherein the pair of longitudinal members and the securing elements are movable inwardly and outwardly as a result of the pair of spring members flexing inwardly and outwardly, respectively.

6 Claims, 3 Drawing Sheets

INTEGRAL CLIP OF PLASTIC MATERIAL

RELATED APPLICATIONS

The present application is national phase of PCT/IB2008/001746 filed Jul. 2, 2008, and claims priority from German Application Number 20 2007 011 105.3 filed Aug. 9, 2007, the disclosures of which are hereby incorporated by reference herein in their entirety.

The present invention relates to an integral clip of plastic material—hereafter plastic integral clip—used to affix door seals in motor vehicle door frames, as defined in the preamble of claim 1.

Clips of the above cited kind are used to affix various parts to a motor vehicle's body. Illustratively plastic integral clips are used to mount seals, respectively sealing strips or projecting edge means, in automobile door frames. They comprise a head cooperating with the seal and a shank fitted with spring elements that when inserted into a body hole are temporarily deformed toward each other and then by means of a snap-in shoulder grip from behind the hole edge on the other side to secure the clip against being pulled out of said hole. It is further known to make use of an elastic flange which is spaced away from the head and which, following assembly, shall rest against the facing body side to seal the hole. In general this flange is conical in order to apply a spring force.

One requirement set on such clips is that they allow easy mounting, in particular that the applied mounting forces be modest. Another requirement is that they be easily disassembled from the body.

The objective of the present invention is to create a plastic clip to be affix door seals to automobile door frames, said clip of the present invention also being securely received in the door frame when significant tolerances apply to said affixation holes.

The clip of the present invention comprises a securing element near an external surface element of the second shank segment running towards the facing spring element. The outside diameter of the securing element substantially matches the outside diameter of the second external surface element of the shank segment in this area.

Because of this feature of the invention, this clip is secured against being pulled or pried out of said affixation holes, by axial and/or circumferential forces, even in the presence of substantial tolerances. Also larger clip stability is attained in the event of disassembly. A further advantage of the clip of the present invention is its enlarged resting surface against the hole's wall. Moreover the clip is bettered centered in said hole.

In one embodiment of the present invention, the radially external surface of the securing element is rounded. Preferably such rounding matches the radius of the affixation hole.

In order that the securing element in turn be dimensionally stable, and accordingly shall be mechanically fairly stiff, another embodiment mode of the present invention provides that it be connected to the flange's facing side.

Preferably the securing element is configured only on one side of the shank segment, the two securing elements in turn preferably being configured on different sides of the second shank segment. This design allows comparatively easily molding the clip of the invention.

In another embodiment of the clip of the present invention, its head is flat and elongated. This feature allows inserting it in comparatively simple manner into an hole of the sealing strip. Preferably the end zones of the elongated head are triangular or trapezoidal, and, in another design of the present invention, they taper from the center toward the ends. This feature further simplifies inserting the head into a sealing strip hole.

When installing the sealing strip in the frame of a motor vehicle door, first the clip shall be connected to that sealing strip wherein its head passes through said strip's hole. In the process said hole is temporarily deformed to allow inserting the said head. On account of said strip's resiliency, said deformation is carried out and subsequently reversed easily.

Next the sealing strip is affixed by means of one or more clips in that door frame where the second shank segment with its spring elements is forced into the holes present in the door frame. These forces required for assembly are comparatively small. On the other hand, high retention force is attained.

An illustrative embodiment mode of the present invention is elucidated below in relation to the appended drawings.

Figure 1:
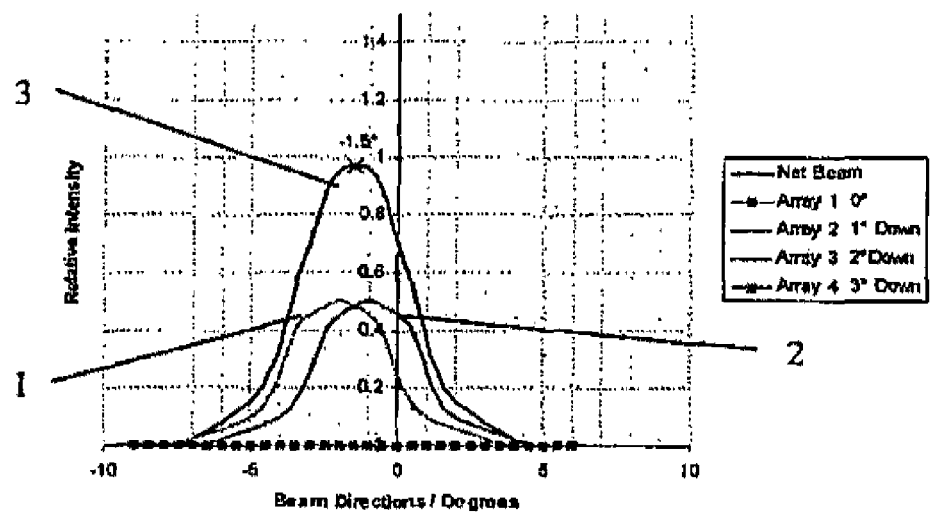
FIG. 1 is a sideview of a clip of the invention.
Figure 2:
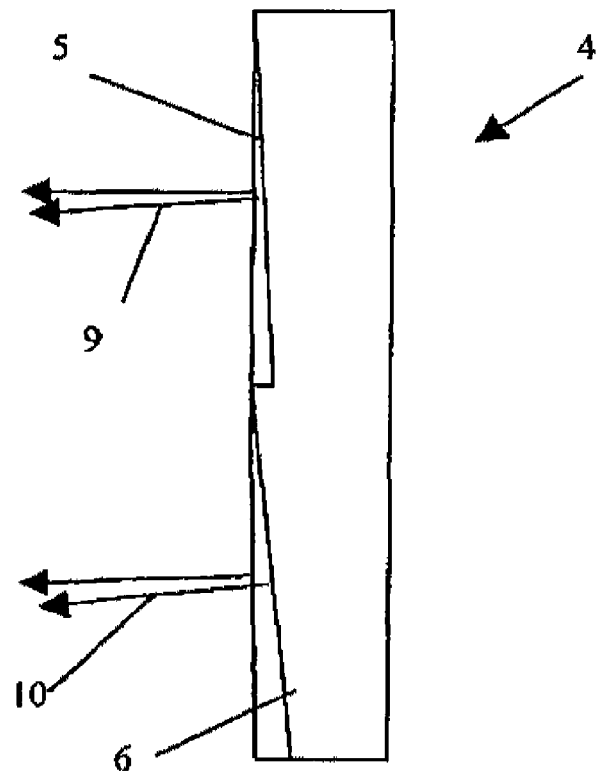
FIG. 2 is a perspective of the clip of FIG. 1 seen obliquely from below.
Figure 3:
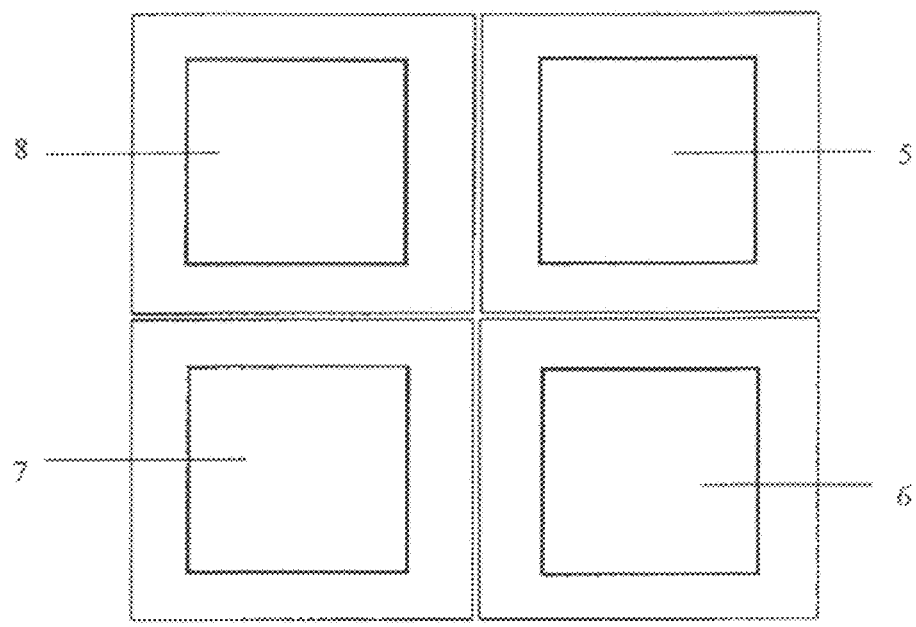
FIG. 3 is a perspective of the clip of FIG. 1 seen obliquely from above.

FIGS. 1 through 3 show a plastic integral clip 10. Said clip comprises a head 12, a first shank segment 14, a conical flange 16 and a second shank segment 18. The head 12 is relatively flat and, seen in topview, it is approximately rectangular at the center comprising two opposite end zones 20, 22 which are substantially triangular respectively trapezoidal as seen from above, these end zones tapering toward the free end. This geometry is shown especially clearly in FIG. 3. Said end zones 20, 22 also slope at their tops toward the free ends.

The first shank segment 14 is cylindrical. The flange 16 is circular and resilient.

The cross-section of the shank segment 18 is elongated and cylindrical and therefore relatively flat. Said segment 18 is fitted with external surface elements, one of which is visible at 24 in FIGS. 1 through 3. The external surface elements 24 converge in arcuate manner toward the free end of the shank segment 18 and are cross-sectionally externally rounded. At the free end they constitute a rounded tip 26.

Two spring elements 28, 30 run from the tip 26 obliquely upward on opposite sides of the shank 18 toward the flange 16 and are offset by 90° relative to the shank segment 18. They are linked to the underside of the flange as indicated by reference numeral 32 in FIGS. 1 and 2. The spring elements 28, 30 are fitted with shoulder or snap-in facets 36, 38, respectively, near the flange 16 to grip the hole edge from below when the clip 10 is inserted into a hole 50. In such a process the spring elements 28, 30 are deformed relative to the shank segment 18 until the detent facets 36, 38 snap into position behind the hole edge. Such a design is already known.

As shown in particular by FIG. 2, securing elements 40 are integrated into the shank segment 18 below the flange 16. The outside surface of the securing elements 40 merges into the outside surface 24 of the shank segment 18. Each securing element 40 is integrated into the shank segment 18 next to an external surface element 24, said securing elements 40 being configured on opposite external sides 24 of the shank segment 18 on different sides of the shank segment 18. The securing elements 40 practically amount to enlarging the shank segment 18 In its upper zone near the flange 16, the outside of the securing element 40 being rounded and its diameter being approximately that of the external sides 24 in the region of the securing elements 40.

Figure 4:
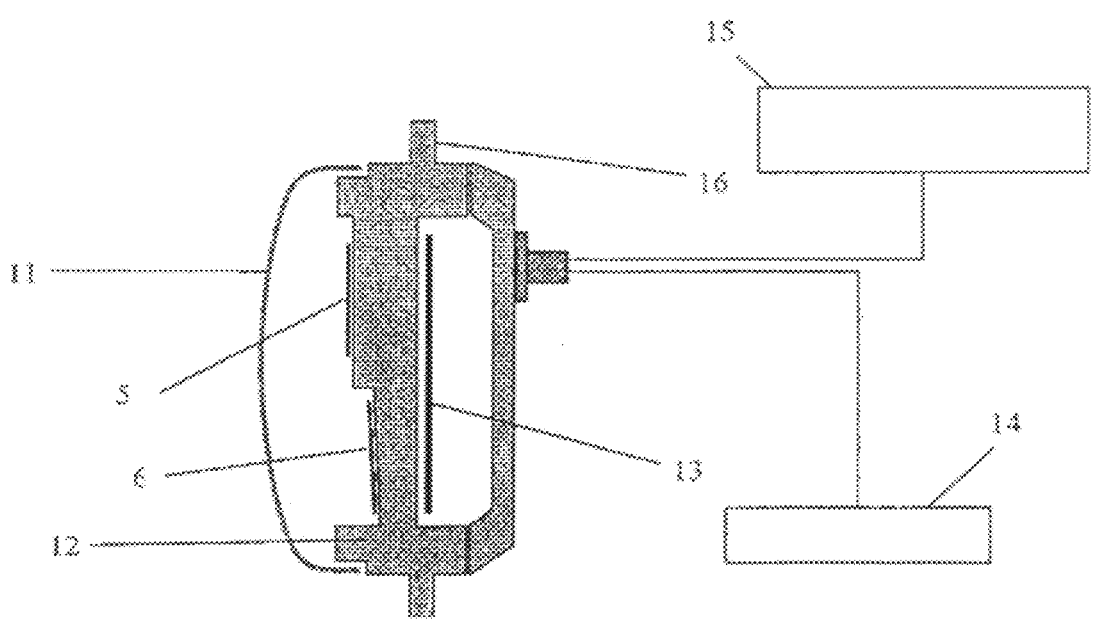
FIG. 4 shows the clip of FIGS. 1 through 3 about to be assembled to the sealing strip.
Figure 5:
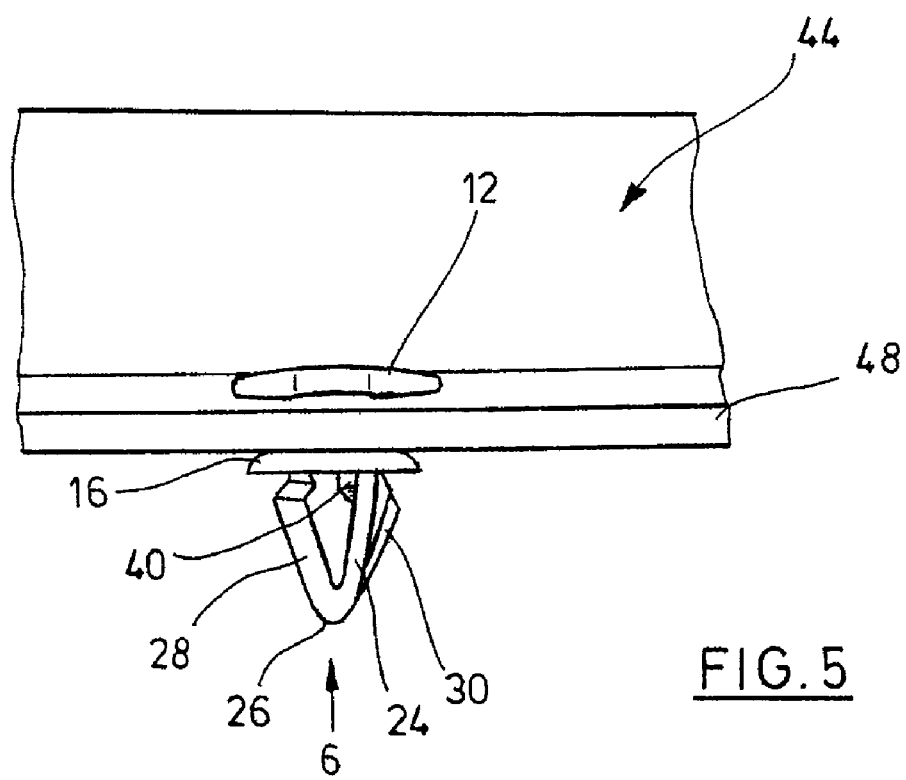
FIG. 5 shows the clip of FIG. 4 after its assembly to the sealing strip.

FIG. 4 shows an elastomeric sealing strip part 44 comprising a circular receiving hole 46. As indicated in FIG. 5, the head 12 is inserted into the hole 46, and, as shown here, said head comes to rest on the top side of a projecting edge 48. The facing side of the flange 16 rests against the underside of said projecting edge 48.

Figure 6:
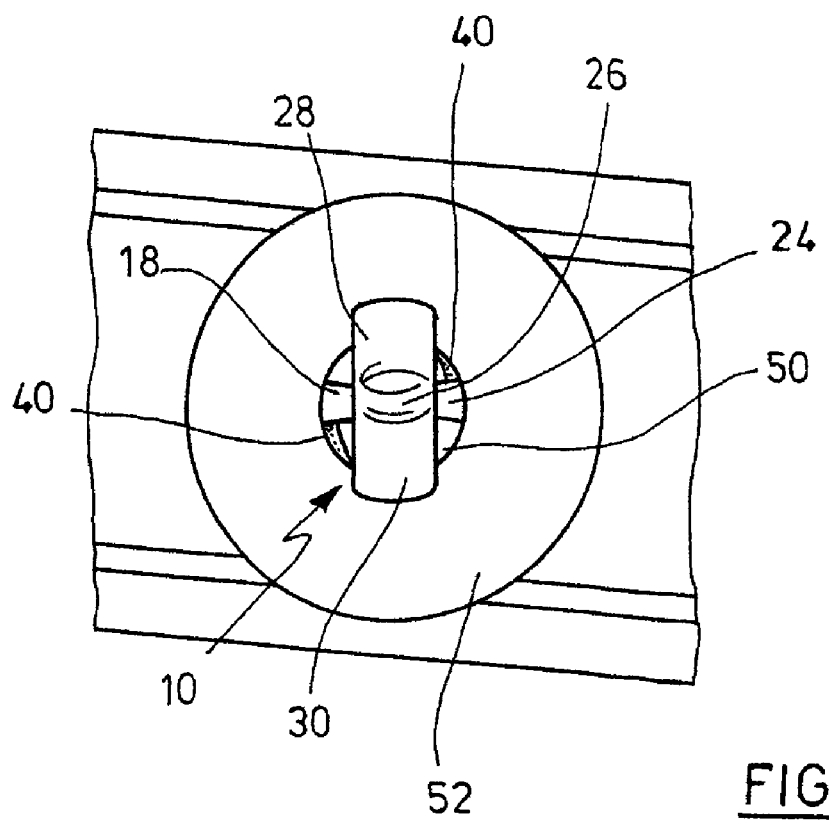
FIG. 6 is a view from below in the direction of the arrow 6 of the assembly of FIG. 5.

FIG. 6 shows an affixation hole 50 in a body part (door frame) of an omitted car, indicted by the circular component 52. Be it borne in mind that, following assembly, the securing elements 40 come to rest against the wall of the hole 50 and as a result firmly affix the clip 10 in said hole.

The invention claimed is:

1. A clip, comprising:
   a first shank having a distal end and a proximal end;
   a head attached to said distal end;
   a resilient flange attached to said first shank proximate to said proximal end;
   a second shank extending downwardly from said resilient flange, wherein said second shank includes a free end;
   a pair of spring members extending obliquely from said free end to said resilient flange, each of said pair of spring members being attached to said resilient flange by a snap-in shoulder;
   a pair of longitudinal members extending from said free end and each having a securing element at an opposing end proximate to said resilient flange, and
   whereby, said securing elements prevent movement of said clip by pressing against an inner surface of a first component aperture being secured to a second component by said clip.

2. The clip of claim 1, wherein the securing elements have a curved outer surface.

3. The clip of claim 1, wherein the securing elements are connected to a lower surface of the resilient flange.

4. The clip of claim 1, wherein the securing elements are positioned on opposing sides of the second shank.

5. The clip of claim 1, wherein the head is flat and elongated.

6. The clip of claim 1, wherein the head is triangular and fitted with a rounded tip.

* * * * *